April 21, 1931.  J. W. LEGG  1,801,775
SURGE RECORDER
Filed Sept. 8, 1924  3 Sheets-Sheet 1

WITNESSES:
A. J. Schiefelbein
E. R. Evans

INVENTOR
Joseph W. Legg.
BY
Wesley G. Carr
ATTORNEY

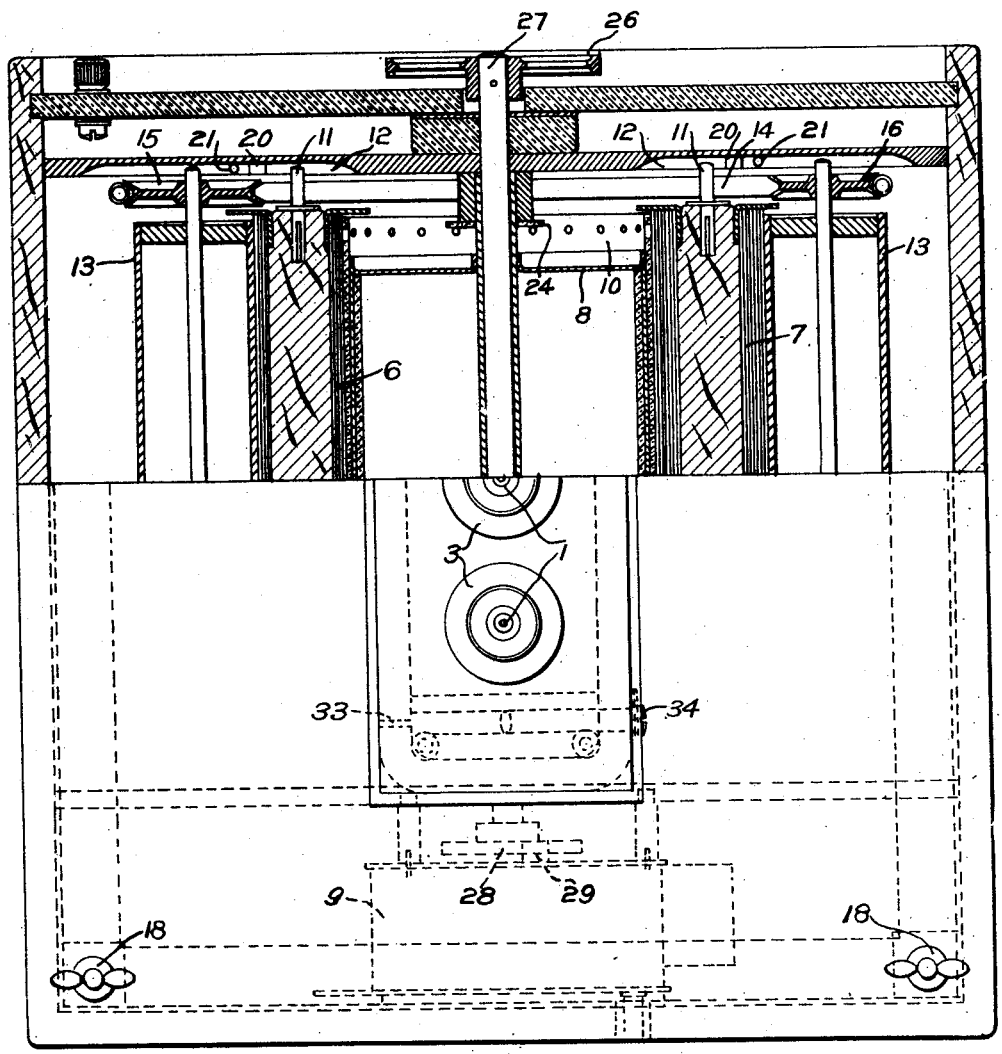

April 21. 1931. J. W. LEGG 1,801,775
SURGE RECORDER
Filed Sept. 8, 1924 3 Sheets-Sheet 3
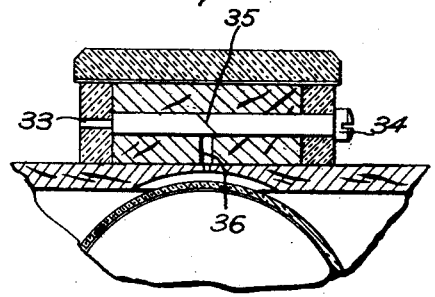
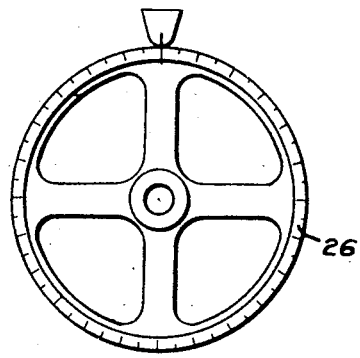
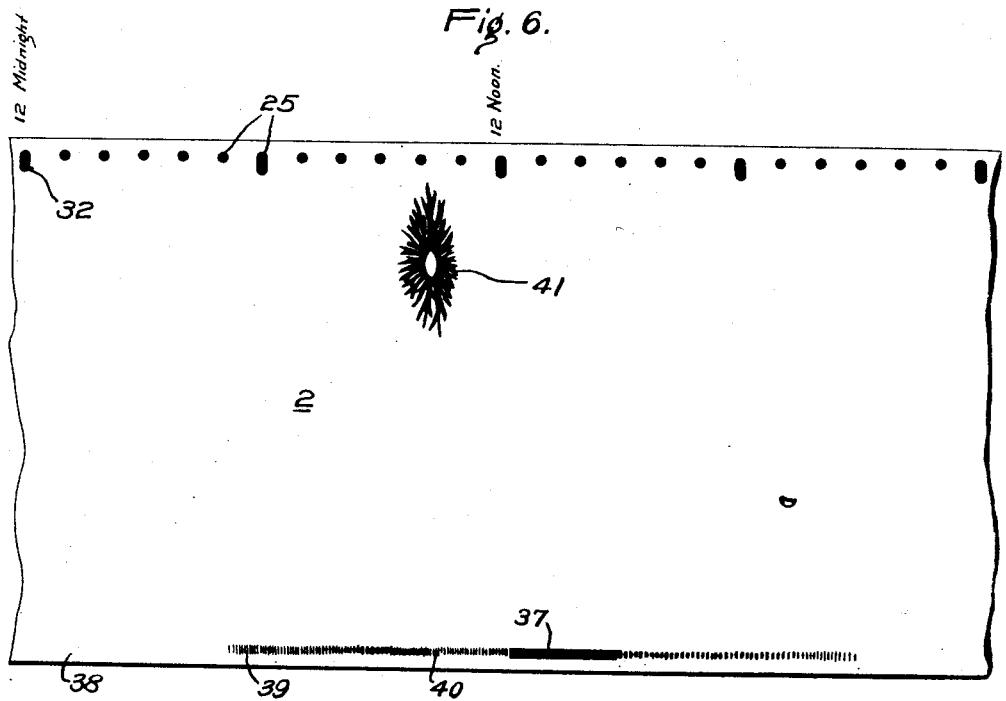
INVENTOR
Joseph W. Legg.
BY
ATTORNEY Patented Apr. 21, 1931

1,801,775

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

SURGE RECORDER

Application filed September 8, 1924. Serial No. 736,412.

My invention relates to electrical recording devices and particularly to surge recorders of the static or photo-sensitive type in which a record of the characteristics of a surge or other transient is obtained through the instrumentality of a conducting electrode in engagement with a photo-sensitive surface, such as a photographic film.

One object of my invention is to provide a device of this character in which a flexible film of celluloid or other composition coated with a suitable emulsion may be used instead of the cumbersome glass plates hitherto employed.

Another object of my invention is to provide a device of this character having a light-proof casing for containing the various elements, the casing being so constructed that it may be readily dismantled to permit the sensitive element or film to be replaced.

A further object of my invention is to provide an instrument having a movable recording element and means for effecting a time record upon the recording element.

A further object of my invention is to provide a surge recorder that is operative over an extended period of time and that has means for recording the general character of the weather or other conditions during such period.

Another object of my invention is to provide a recording device that will effect an improved record of the conditions obtaining in an electrical transmission system and of other conditions related thereto.

Figure 1 of the accompanying drawings is a view, in cross-section, of a surge recorder constructed in accordance with my invention;

Fig. 3 is a plan view of the instrument shown in Figs. 1 and 2, with parts shown in section in order to reveal the construction more clearly;

Fig. 4 is a detail view of the arrangement for adjusting the amount of external light that is permitted to affect the sensitized film;

Fig. 5 is a detail view of the adjusting knob having the time indications marked thereon, and Fig. 6 is a fragmentary view of the record obtained by the recording instrument.

Figure 1:
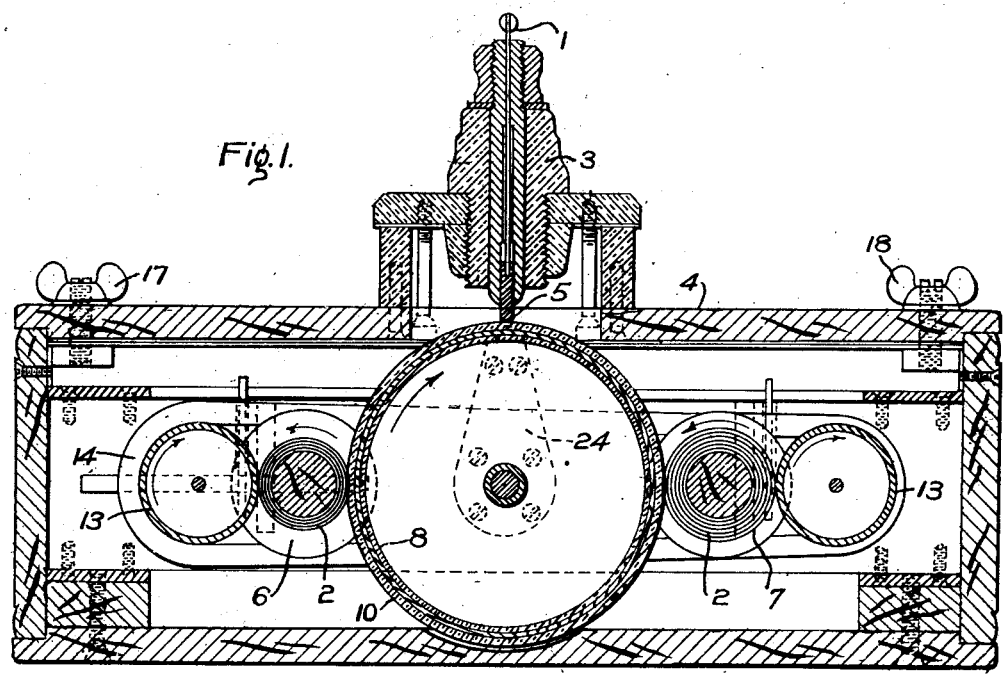
Figure 2:
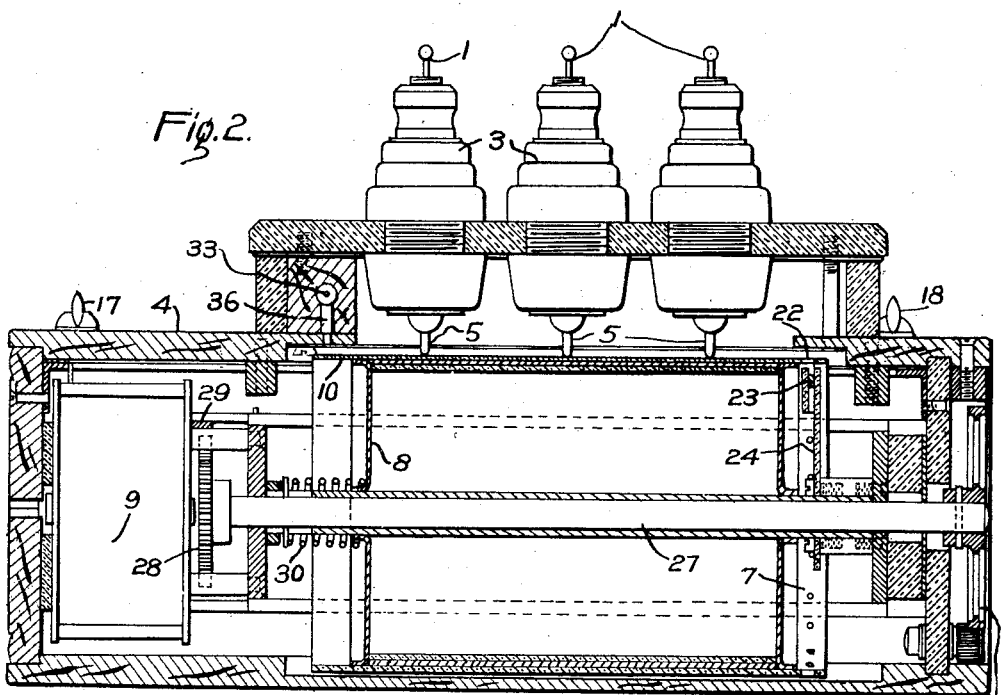
Fig. 2 is a longitudinal sectional view of the instrument shown in Fig. 1.

Referring to Figs. 1 and 2, the recorder comprises electrodes 1 cooperating with a sensitized film 2, such as the flexible, sensitized film of celluloid coated with emulsion that is ordinarily used in photographic work. The electrodes 1 are mounted upon insulators 3, that are, in turn, supported upon the light-proof casing 4 containing the elements of the recorder. The electrodes 1 are loosely supported in the insulators 3 to permit a slight vertical movement thereof and are provided with blunt points 5 engaging the film 2. The film 2 is carried upon two reels or cartridges 6 and 7 and is supported in engagement with the electrodes 1 by a cylindrical drum 8 that is driven at constant speed by clock-work mechanism 9 through the shaft 27 and the gears 28 and 29. The drum 8 is grounded and is insulated from the electrodes 1 by a cylinder 10 of suitable insulating material.

By reason of the described relation of the electrodes 1 to the photo-sensitive film 2 and the drum 8, a record will be produced upon the film in case a potential in excess of 2000 volts is applied to one of the electrodes. As pointed out in an article by J. F. Peters in the "Electrical World" for April 19, 1924, the record produced on the sensitized element depends upon the intensity, polarity and duration of the applied voltage and is produced even though a voltage surge or transient occurs that is of exceedingly brief duration. While it is preferable to maintain the electrodes in contact with the sensitized film, a record will also be produced if the electrodes and film are spaced apart.

It is essential that the film 2 lie smoothly over the drum 8 adjacent the electrodes 1, and I have ensured this result by supporting the same upon a cylindrical drum which presents a convex surface to the electrodes.

The cartridges 6 and 7 containing the sensitized film are mounted upon trunnions 11 resting in horizontal grooves 12 in the sides of the casing, as shown in Fig. 3. In the grooves 12 are also pivoted two idler rollers 13, that are held in engagement with the film upon the cartridges 6 and 7 by a flexible belt 14 consisting of a coiled steel spring. Attached to the two idler rollers 13 are two pulleys 15 and 16 for receiving the belt 14. The pulley 15 is larger than the pulley 16 and, consequently, as the film is used up and the cartridges 6 and 7 and the rollers 13 rotate in the directions shown in Fig. 1, the tension on the lower side of the belt 14 is greater than the tension on its upper side. This condition results from the fact that, since all of the rollers are in frictional rolling engagement, their peripheral velocities are equal, and the rollers 13 being of equal diameters rotate at the same speed. Therefore, the pulley 15, being larger than the pulley 16, has the greater peripheral velocity, and the belt 14 exerts a retarding effect on the pulley 15 and the opposite effect on the pulley 16. The result is a constant tension on the film 2 for holding the same taut, regardless of the changes in the effective diameters of the film cartridges 6 and 7.

When it is necessary to reload the recorder with a new film, the wing nuts 17 and 18 are unscrewed, and the top of the casing 4 is removed. The cartridges 6 and 7 are moved against the force of the spring belt 14 until the trunnions 11 coincide with the vertical slots 20, (see Fig. 3). The cartridges may then be lifted vertically out of the slots 20 and removed, and an unexposed roll of film substituted for the empty spool. After the film spools are removed, the pins 21 limit the inward movement of the rollers 13 by engaging the trunnions on which said rollers are mounted.

The periphery of the insulating cylinder 10 is provided with a plurality of equally spaced holes 22, as shown in Fig. 2. Adjacent these holes, inside of the cylinder 10, a small block or bead coated with a luminous substance, such as luminous paint, is supported upon a supporting arm 24. As the cylinder 8 rotates and carries the sensitized film past the electrodes 1, the luminous bead 23 effects a record of the positions of the holes 22 with respect to the film. As shown in Fig 6, the film, when developed, shows a series of dots 25 which serve to show the relative positions of the clock-driven drum 8 and the film 2. Every sixth mark is of different configuration, so that the time when surges occur may be more easily determined. The clock-work mechanism may be arranged to rotate the drum 8 once in twenty-four hours and the periphery of the cylinder 10 is provided with twenty-four equidistant holes, every sixth one being elongated.

In order to permit the time of the occurrence of a surge to be determined from the film, the film may be initially adjusted as follows: After the unexposed reel or cartridge 6 has been inserted in the instrument and the paper that comprises the outside of the cartridge partly unrolled and attached to the empty cartridge 7, the cover 4 is replaced, thereby bringing the points 5 of the electrodes into engagement with the film paper. The adjusting knob 26 that is carried by the shaft 27 of the drum 8 (Fig. 2) is manipulated to disengage the gear 28 from the clock-work pinion 29. The shaft 27 is so mounted that a slight longitudinal movement against the biasing spring 30 effects disengagement of the gears 28 and 29.

The adjusting knob 26 is now turned until the end of the film is moved under the electrodes 1. Since the point of attachment of the paper to the film causes an uneven spot at this point and a resulting movement of the electrodes 1, this point may be readily noted. The adjusting knob 26 is then turned farther until the time indicated with reference to one of the longer marks on the knob (see Fig. 5) agrees with the actual time when the instrument is to be reconnected in the circuit. The adjusting knob 26 is then released, and the spring 30 effects the engagement of the gears 28 and 29, so that additional movement of the film is under the control of the clock-work driving mechanism.

The positions of the luminous bead 23 and the holes 22 are so related to the graduations of the adjusting knob 26 that the resulting record upon the film 2 will show when the surges occur that are recorded upon the film. Thus, if the first mark 32 represents 12:00 o'clock midnight, a surge record directly opposite this mark is produced at this time. Inasmuch as the ensuing marks 25 are also made in accordance with actual time, the time of occurrence of later surges is also shown by their relation thereto.

In order to produce an additional record on the film 2 in accordance with related conditions that may be of interest in analyzing the causes of surges, I have provided a restricted aperture 33 (see Fig. 4) in the outside casing of the instrument adapted to expose the edge of the film 2 in accordance with the intensity of daylight. Opposite the aperture 33 is a rotatable screw or pin 34 having an oblique end 35 coated with white paint or other light-reflecting material. A vertical opening 36 extends from the oblique end of the screw 34 above the end of the film-supporting drum 10. In accordance with the amount of light transmitted through the restricted aperture 33, as the cylinder 10 is rotated, a variable record is made on the photographic film, as shown at 37 in Fig. 6. The amount of light reflected upon the film may be varied to meet varying conditions, such as a change from an indoor to an outdoor installation of the instrument, by turning the screw 34.

The light band produced on the film aids in fixing the time represented by the marks 25; i. e., it shows whether they are recorded at night or in the daytime. Thus, the absence of any record at the point 38 indicates that it was during the night that such portion of the film was adjacent the opening 36. The commencement of a record at a point 39 indicates that the time that such part of the film was exposed to the aperture was at daybreak. When the increasing intensity of the record is interrupted, as at the point 40, it indicates that the light transmitted through the aperture 33 was reduced and, therefore, that the weather changed from clear to cloudy weather. The presence upon the film of a surge record 41 at this point would indicate that a storm has arisen during which a lightning discharge caused a surge upon the circuit to which the instrument was connected.

The instrument may be connected in any suitable manner to a circuit that is subject to abnormal surges of current. In order to effect a record of a surge, it is necessary to impress a voltage of from 2000 to 15000 volts between one of the electrodes 1 and the grounded cylinder 8. In case higher voltages are encountered, a condenser multiplier may be inserted between the electrodes 1 and the circuit, as described in the above-mentioned article by Peters.

While I have shown a preferred form of my invention in order that the operation thereof may be clearly understood, I do not consider that it is limited to the precise form shown and described and I do not wish it to be limited in scope except as limitations may be imposed by the appended claims.

I claim as my invention:

1. An electrical instrument comprising a flexible strip of sensitized film, a conducting member having a convex surface for supporting the same, and a conducting electrode in engagement with said film and co-operative with the conducting supporting member, when properly connected to an external circuit to establish an electrostatic stress across the film to influence it upon the occurrence of a surge in the circuit.

2. An instrument for recording surges comprising a rotatable element embodying a metallic cylinder, a flexible recording element supported thereby, and a metallic electrode engaging the recording element and cooperative with the rotatable element to establish an electrostatic stress upon the occurrence of a surge condition in an electric circuit to which the instrument is connected, to influence the recording element in accordance with the nature of the surge.

3. An instrument for recording surges comprising a rotatable element embodying a metallic cylinder, a flexible recording element supported thereby, and a metallic electrode engaging the recording element and cooperative with the rotatable element to establish an electrostatic stress upon the occurrence of a surge condition in an electric circuit to which the instrument is connected, to influence the recording element in accordance with the nature of the surge, and means for moving the recording element between the electrode and the rotatable element.

In testimony whereof, I have hereunto subscribed my name this 18th day of August, 1924.

JOSEPH W. LEGG.